United States Patent [19]

Ogawa et al.

[11] 4,202,906

[45] May 13, 1980

[54] CHEWING GUM BASE CONTAINING A THERMALLY DECOMPOSED PRODUCT OF A NATURAL RUBBER AND A METHOD OF PREPARATION THEREOF

[75] Inventors: Koichi Ogawa, Tokyo; Shichigoro Tezuka, Hawasaki; Yoshinori Sato, Tokorozawa; Michio Moroe, Mitaka; Haruki Tsuruta, Yokohama; Toshio Yoshida, Yokohama, all of Japan

[73] Assignees: Lotte Co., Ltd.; Takasago Perfumery Co., Ltd., both of Tokyo, Japan

[21] Appl. No.: 948,910

[22] Filed: Oct. 5, 1978

[30] Foreign Application Priority Data

Oct. 12, 1977 [JP] Japan ................... 52-121544

[51] Int. Cl.$^2$ ................................ A23G 3/30
[52] U.S. Cl. ............................ 426/3; 426/6
[58] Field of Search ..................... 426/3, 5, 6

[56] References Cited

U.S. PATENT DOCUMENTS

| | | | |
|---|---|---|---|
| 1,397,742 | 11/1921 | Rapp | 426/6 |
| 1,418,271 | 6/1922 | Beatty | 426/3 |
| 2,050,272 | 8/1936 | Canning | 426/6 |
| 2,444,871 | 7/1948 | Cahoe | 426/6 |
| 3,440,060 | 4/1969 | Rife | 426/6 |

*Primary Examiner*—Jeanette M. Hunter
*Attorney, Agent, or Firm*—Watts, Hoffmann, Fisher & Heinke Co.

[57] ABSTRACT

A chewing gum base containing natural rubber, basic gum additives and a decomposition product obtained by thermally decomposing natural rubber at a temperature of 200° C. to 350° C. in an inert atmosphere and removing low boiling point fractions up to 160° C. at a pressure of approximately 1 mm Hg.

9 Claims, No Drawings

CHEWING GUM BASE CONTAINING A THERMALLY DECOMPOSED PRODUCT OF A NATURAL RUBBER AND A METHOD OF PREPARATION THEREOF

BACKGROUND OF THE INVENTION

This invention relates to a chewing gum base containing a thermally decomposed product of a natural rubber and if desired a milled natural rubber, and to a method of preparing the same. The thermally decomposed product is freed from low-boiling substances.

Heretofore, a synthetic resin such as polyvinyl acetate resin or a natural material such as chicle, jelutong or the like has been used as a chewing gum base. The synthetic gum base made essentially from the vinyl acetate resin entails such disadvantages that the chewing fum prepared therefrom is rapidly softened by incorporating a saliva under chewing and that the flavor of the chewing gum is readily dissolved out since the gum base of this type possesses a relatively high hydrophilic nature. Therefore, a natural resinous material such as chicle, jelutong, sorba or the like has been advantageously used as the chewing gum base, and among others the chicle has been considered most advantageous.

These natural resinous materials, however, have not been successfully cultivated, so that the prices are high and the natural resources are limited in future.

On the contrary, a natural rubber of high elasticity has been profitably cultivated and is easily available at low price, so that it has been used in a great amount for the use requiring high elasticity such as a tire. The natural rubber, however, has never been used as a chewing gum base.

The inventors have earnestly endeavored to prepare a chewing gum base having a better softening property under chewing and also having a better retention of the flavors of the chewing gum by the use of the natural rubber which is abundant in natural resources and is available at low price, and have now succeeded in preparing the chewing gum base having the better properties than those of the conventional synthetic gum base by incorporating a thermally decomposed product of the natural rubber and if desired a milled natural rubber into basic materials for the chewing gum.

The Japanese opened applications No. 76239/75, No. 77301/75 and No. 10013/76 disclose the methods for preparation of hydrocarbons by the thermal decomposition of synthetic polyisoprene rubber or natural rubber and also disclose that the saturated hydrocarbons prepared by the above methods may be used in the cosmetics. Up to now, however, it has been unknown to use the thermally decomposed products of the synthetic or natural rubbers for the foods, especially for the chewing gum.

SUMMARY OF THE INVENTION

Accordingly, the principal object of the invention is to provide a chewing gum base which comprises 2 to 60% by weight of a natural rubber component consisting of only a thermally decomposed product of a natural rubber or of a combination of said thermally decomposed product with a milled natural rubber, and 98 to 40% by weight of basic materials for the chewing gum.

Another object of the invention is to provide a method of preparing a chewing gum base which comprises thermally decomposing a natural rubber in an inert atmosphere, removing low-boiling fractions from the thermally decomposed material and mixing a thus-obtained thermally decomposed product of the natural rubber with basic materials for the chewing gum.

Still another object of the invention is to provide a method of preparing a chewing gum base which comprises on one hand milling a natural rubber to produce a milled natural rubber having a reduced viscosity while thermally decomposing the natural rubber in an inert atmosphere and then removing low-boiling fractions from the thermally decomposed material to produce a thermally decomposed product, and mixing said milled natural rubber, said thermally decomposed product and basic materials for the chewing gum.

DESCRIPTION OF THE INVENTION

The milled natural rubber used in the chewing gum base of the invention has a reduced viscosity. Namely, the Mooney viscosity of 70 to 80 ($ML_{1+4}$ 100° C.) in the original natural rubber is reduced to 10 to 35 ($ML_{1+4}$ 100° C.) with lowering of the molecular weight through the milling operation. In the chewing gum base of the invention the milled natural rubber is used in an amount of 0 to 40% by weight, preferably 25 to 35% by weight, based on the natural rubber component (total amount of the thermally decomposed rubber product plus the milled natural rubber if any).

The thermally decomposed product of the natural rubber used in the chewing gum base of the invention may be obtained by thermally decomposing the natural rubber in the inert atmosphere or under so-called unaerobic condition, and by removing the low-boiling fractions from the thermally decomposed rubber material. The term of "inert atmosphere" signifies the substantial absence of oxygen or air, namely the unaerobic condition. If the thermal decomposition is carried out under so-called aerobic condition, the natural rubber is excessively decomposed to form undesirable decomposed substances which can not be eliminated in the subsequent removal step for the low-boiling fractions. Thus, the aerobic condition must be avoided in the thermal decomposition step for the natural rubber. The inert atmosphere may be created by evacuation of air or by the presence of an inert gas such as gaseous nitrogen or carbon dioxide. The thermal decomposition may be carried out at the temperature of 200° to 350° C. in a vessel equipped with a vacuum distillation apparatus or on a heated iron plate and generally requires 3 to 6 hours, depending on the amount of the natural rubber to be decomposed and the decomposition temperature. Thereafter, the thermally decomposed material thus obtained is distilled under reduced pressure to remove off the low-boiling fractions. This removal step preferably distils off the low-boiling fractions which have the boiling points below 160° C. at 1 mm Hg. and which contain all the disagreeable ordors of the decomposed rubber. The vacuum distillation may be carried out with the conventional distillation techniques. In the chewing gum base of the invention the thermally decomposed product after the vacuum distillation is used in an amount of 100 to 60% by weight, preferably 75 to 65% by weight of the natural rubber component (total amount of the thermally decomposed rubber product plus the milled natural rubber if any) .

The natural rubber component consisting of the thermally decomposed product and of the milled natural rubber if desired is mixed in an amount of 2 to 60% by weight, preferably 10 to 60% by weight of the intended chewing gum base, with the basic materials for the chewing gum.

The basic materials used in the chewing gum base of the invention include the conventional raw materials in the chewing gum industry, for example vinyl acetate resin, isoprene-isobutylene rubber, polyisobutylene, ester gum, wax, mono-glyceride, calcium carbonate, talc and others. According to the invention, a good result may be obtained when the vinyl acetate resin is used as a principal ingredient of the basic materials. The basic materials are used in an amount of 98 to 40% by weight, preferably 90 to 60% by weight of the intended chewing gum base.

The chewing gum base of the invention may be prepared in the following manner.

In one process, the natural rubber is thermally decomposed at the temperature of 200° to 350° C. in the inert atmosphere (under the substantial absence of oxygen) which has been created by evacuation of air or by the presence of an inert gas such as nitrogen, carbon dioxide or the like. The thermally decomposed material thus obtained is then subjected to the vacuum distillation to distil off the fractions having the boiling points below 160° C. at 1 mm Hg. Thus, the thermally decomposed product of the natural rubber is obtained, the disagreeable odors of which are substantially eliminated.

In another process, if necessary, the natural rubber is milled by the use of the roller or the Banbury mixer until the Mooney viscosity of the original natural rubber of 70 to 80 ($ML_{1+4}$ 100° C.) has been reduced to 10 to 35 ($ML_{1+4}$ 100° C.) due to the lowering of the molecular weight of the rubber.

Finally, the thermally decomposed product of the natural rubber and if desired the milled natural rubber produced in the above respective processes are mixed with the basic materials for the chewing gum, thereby to give the chewing gum base of the invention.

The chewing gum prepared from the chewing gum base of the invention has extremely improved properties, such as elasticity, smoothness, resinous feeling, hardness under chewing and retention of the flavors, which are important to the chewing gum, in comparison with the conventional chewing gums prepared by using only a polyvinyl acetate gum base.

The invention is now illustrated by way of the following examples.

EXAMPLES

Example 1 (Preparation of the thermally decomposed product of the natural rubber)

108 g of the natural rubber was charged into a 1 l flask and was melted by heating at 260° C. under stream of the nitrogen gas. The thermal decomposition was carried out at the same temperature for about 5 hours to give 15.0 g of a decomposed fraction flowed out along with the nitrogen stream and 78.2 g of another decomposed fraction retained in the vessel. Both fractions were combined and distilled under the reduced pressure of 1 mm Hg. to give the following fractions.

| Fractions | Distil. Temperature | Yield (%) |
| --- | --- | --- |
| No. 1 | 35°–80° C./ 1 mmHg | 6.7g (7.19) |
| No. 2 | 80°–120° C. 1 mmHg | 4.4g (4.72) |
| No. 3 | 120°–160° C. 1 mmHg | 3.6g (3.86) |
| No. 4 | 160°–205° C. 1 mmHg | 6.7g (7.19) |

-continued

| Fractions | Distil. Temperature | Yield (%) |
| --- | --- | --- |
| No. 5 | 205°–250° C. 1 mmHg | 26.0g (27.90) |
| No. 6 | 250°–280° C. 1 mmHg | 33.3g (35.73) |
| No. 7 | 280°–285° C. 1 mmHg | 3.3g (3.54) |
| No. 8 | 285° C. -1 mmHg | 1.7g (1.82) |
| Loss | | 7.5g (8.05) |

The fractions No. 1 to No. 3 having a foreign odor due to the rubber decomposition were discharged, and the fractions No. 4 to No. 8 were combined to give a blackish brown resinous product having a softening point of 52.5° C., which was used for preparation of the chewing gum base.

Example 2 (Preparation of the thermally decomposed product of the natural rubber)

52.0 g of the natural rubber was charged into a 200 ml flask equipped with a distillation column, was melted by heating at 250° to 265° C. under the reduced pressure of 1 mmHg, and was thermally decomposed for 3.5 hours, accompanied by distillation to give the following fractions.

| Fractions | Distil. Temperature | Yield (%) |
| --- | --- | --- |
| No. 1 | 35°–80° C./ 1 mmHg | 15.2g (29.2) |
| No. 2 | 80°–120° C. 1 mmHg | 4.4g (8.5) |
| No. 3 | 120°–160° C. 1 mmHg | 2.7g (5.2) |
| No. 4 | 160°–205° C. 1 mmHg | 9.4g (18.1) |
| No. 5 | 205°–250° C. 1 mmHg | 9.5g (18.2) |
| No. 6 | 250°–280° C. 1 mmHg | 6.2g (11.9) |
| No. 7 | 280°–285° C. 1 mmHg | 0.6g (1.2) |
| No. 8 | 285° C. -1 mmHg | 1.9g (3.7) |
| Loss | | 2.1g (4.0) |

The fractions No. 1 to No. 3 having a foreign odor due to the rubber decomposition were discharged, and the fractions No. 4 to No. 8 were combined to give a resinous product having a softening point of 54° C., which was used for preparation of the chewing gum.

Example 3 (Preparation of the milled natural rubber)

500 g of the raw natural rubber in the sheet form was subjected to the milling by means of double rollers spaced apart in 5 mm. distance from each other, for about 180 minutes to give the milled natural rubber having a reduced Mooney viscosity of 13.5 ($ML_{1+4}$ 100° C.).

Example 4 (Preparation of the milled natural rubber)

30 Kg of the natural rubber was milled with the Banbury mixer for about 90 minutes to give the milled natural rubber having a reduced Mooney viscosity of 25 ($ML_{1+4}$ 100° C.).

Example 5 (Preparation of the chewing gum base)

Each raw material was weighed into a stainless cup in accordance with the recipe shown in Table 1 and was completely dissolved in an oven at 130° C. The mixture was further stirred well and was poured into a vessel for cooling. Thus, the chewing gum base A to F and the control gum base shown in Table 1 were obtained.

Example 6 (Preparation of the chewing gum)

Each 100 g of the gum bases A to F or the control gum base, a powder sugar (manufactured by grinding a granulated sugar) in 300 g, glucose in 30 g, a starch syrup in 70 g, glycerin in 2 g and a spearmint essential oil in 3 g were put into a mixer, were kneaded for about 10 minutes. The kneaded material was then rolled and cut into pieces to give the corresponding chewing gum $A_G$ to $F_G$ or the control gum.

Organoleptic evaluation

The chewing gums $A_G$ to $F_G$ and the control gum prepared in Example 6 were chewed for about 5 minutes and were organoleptically tested in the conventional manner in accordance with the evaluation items and standards listed in Table 2.

As apparent from the results shown in Table 2, the chewing gums $A_G$ to $E_G$ prepared from the chewing gum base of the invention were highly improved in total evaluation in comparison with the control gums which do not contain the thermally decomposed product of the natural rubber.

TABLE 1

| Ingredient | Gum Base A | B | C | D | E | F(control) | Control |
|---|---|---|---|---|---|---|---|
| Therm. decomp. prod. of Ex. 1 | 1.4 part | 10.5 part | 42 part | 105 part | — | — | — |
| Therm. decomp. prod. of Ex. 2 | — | — | — | — | 20 part | — | — |
| Milled natural rubber of Ex. 3 | 0.6 | 4.5 | 18 | 45 | — | — | — |
| Milled natural rubber of Ex. 4 | — | — | — | — | — | 20 part | — |
| Vinyl acetate resin | 28 | 28 | 28 | 28 | 28 | 28 | 28 part |
| Ester gum | 10 | 10 | 10 | 10 | 10 | 10 | 10 |
| Polyisobutylene | 27 | 27 | 27 | 27 | 27 | 27 | 27 |
| Wax | 20 | 20 | 20 | 20 | 20 | 20 | 20 |
| Monoglyceride | 1 | 1 | 1 | 1 | 1 | 1 | 1 |
| Calcium carbonate | 14 | 14 | 14 | 14 | 14 | 14 | 14 |
| Total | 102 part | 115 part | 160 part | 250 part | 120 part | 120 part | 100 part |
| Content % | 1.96% | 13.04% | 37.5% | 60% | 16.67% | 16.67% | 0% |

TABLE 2

| Evaluation Item* | Chewing Gum $A_G$ | $B_G$ | $C_G$ | $D_G$ | $E_G$ | $F_G$(control) | Control |
|---|---|---|---|---|---|---|---|
| Elasticity | 3 point | 5 point | 5 point | 3 point | 3 point | 4 point | 3 point |
| Smoothness | 4 | 5 | 5 | 4 | 5 | 3 | 3 |
| Resinous feeling | 4 | 4 | 5 | 5 | 5 | 3 | 3 |
| Hardness at the middle period | 4 | 5 | 5 | 4 | 4 | 4 | 3 |
| Hardness at the late period | 4 | 5 | 5 | 3 | 4 | 4 | 2 |
| Flavor retention | 4 | 4 | 5 | 5 | 4 | 3 | 2 |
| Total evaluation | 23/30 point | 28/30 point | 30/30 point | 24/30 point | 25/30 point | 21/30 point | 16/30 point |

Evaluation Standard
5 point : excellent
4 point : good
3 point : moderate
2 point : rather poor
1 point : poor
*Evaluation Item
Elasticity : Whether the chewing gum has the proper degree of elasticity.
Smoothness : Whether the texture of the chewed tailings in the mouth is smooth or not.
Resinous feeling : Whether the chewing gum has a resinous texture, into which the teeth can bite well.
Hardness at the middle period : Whether the texture of the chewing gum becomes extremely soft when the sugar is being lost.
Hardness at the late period : Whether the texture of the chewing gum becomes soft when kept chewing after the sugar has been lost.
Flavor retention : Whether the flavor is retained long in the chewing gum after the sugar has been lost.

What is claimed is:

1. A chewing gum base consisting essentially of from 2 to 60% by weight of a natural rubber component and from 40 to 98% by weight of basic materials for the chewing gum, said natural rubber component being at least 60 parts by weight of a decomposition product obtained by thermally decomposing natural rubber at a temperature of from 200° to 350° C. in an inert atmosphere and the removing low boiling fractions having boiling points up to about 160° C. at a pressure of approximately 1 mmHg.

2. A chewing gum base as claimed in claim 1 wherein said natural rubber component contains milled natural rubber in an amount up to 40% by weight based on the total weight of said natural rubber component.

3. A chewing gum base as claimed in claim 2 wherein said natural rubber component contains in amounts by weight based on the total weight of said component, 25 to 35% milled natural rubber and 65 to 75% of said decomposition product.

4. A chewing gum base as claimed in claim 2 or claim 16 wherein the milled natural rubber has a Mooney viscosity of 10 to 35 ($ML_{1+4}$ 100° C.).

5. A chewing gum base as claimed in claim 1, 2 or 3 in which the basic materials for the chewing gum are selected from the class consisting of vinyl acetate resin, ester gum, polyisobutylene, wax, monoglyceride and calcium carbonate.

6. A chewing gum base as claimed in claim 1, 2 or 3 in which the basic materials for the chewing gum contain vinyl acetate resin as the principal ingredient.

7. A method of preparing a chewing gum base comprising the steps of thermally decomposing a natural rubber at a temperature of from 200° to 350° C. in the substantial absence of oxygen, removing low boiling fractions having boiling points up to about 160° C. at a pressure of approximately 1 mmHg, and mixing the thermally decomposed natural rubber with basic materials for the chewing gum.

8. A method of preparing a chewing gum base comprising the steps of thermally decomposing a natural rubber at a temperature of from 200° to 350° C. in the substantial absence of oxygen, removing low boiling fractions having boiling points up to about 160° C. at a pressure of approximately 1 mmHg, mixing the thermally decomposed rubber with milled natural rubber to obtain a natural rubber component consisting of at least 60% of the thermally decomposed rubber and up to 40% by weight of the milled natural rubber, and mixing the natural rubber component with the basic materials for the chewing gum.

9. A method as claimed in claim 8 wherein the milled natural rubber has a Mooney viscosity of 10 to 35 ($ML_{1+4}$ 100° C.).

* * * * *